United States Patent [19]

Ide

[11] Patent Number: 5,024,622
[45] Date of Patent: Jun. 18, 1991

[54] DETACHABLE PROBE-TYPE ELECTRONIC CLINICAL THERMOMETER

[75] Inventor: Tetsuya Ide, Fuji, Japan

[73] Assignee: Terumo Kabushiki Kaisha, Tokyo, Japan

[21] Appl. No.: 362,022

[22] Filed: Jun. 6, 1989

[30] Foreign Application Priority Data

Jun. 9, 1988 [JP] Japan .................. 63-140519

[51] Int. Cl.$^5$ .................................. H01R 7/06
[52] U.S. Cl. ............................. 439/829; 439/822
[58] Field of Search ............ 439/816, 817, 819, 822, 439/829, 835, 836, 482, 166, 169, 170, 171, 172, 173, 174, 175, 266

[56] References Cited

U.S. PATENT DOCUMENTS

| | | | |
|---|---|---|---|
| 2,240,394 | 4/1941 | Eaton | 439/266 |
| 2,857,572 | 10/1958 | Belart | 439/482 |
| 3,821,689 | 6/1974 | Graham | 439/829 |
| 4,353,372 | 10/1982 | Ayer | 439/822 |
| 4,700,997 | 10/1987 | Strand | 439/836 |

FOREIGN PATENT DOCUMENTS

| | | |
|---|---|---|
| 56-43032 | 4/1981 | Japan . |
| 57-112485 | 7/1982 | Japan . |
| 59-180386 | 12/1984 | Japan . |
| 60-17585 | 2/1985 | Japan . |

Primary Examiner—Joseph H. McGlynn
Assistant Examiner—Hien D. Vu
Attorney, Agent, or Firm—Frishauf, Holtz, Goodman & Woodward

[57] ABSTRACT

A detachable probe-type electronic clinical thermometer includes a temperature measuring probe and the main body of the thermometer, the probe and thermometer body each having a connector for connecting them together. Each connector is provided with a plurality of corresponding electrical contacts, with the contacts of the connector on the thermometer body side comprising respective spring-like bodies. When the two connectors are connected to each other, the spring-like bodies of the thermometer body connector independently urge the corresponding contacts of the probe connector.

6 Claims, 5 Drawing Sheets

DETACHABLE PROBE-TYPE ELECTRONIC CLINICAL THERMOMETER

BACKGROUND OF THE INVENTION

1. Field of the Invention

This invention relates to a detachable probe-type electronic clinical thermometer and, more particularly, to a detachable probe-type electronic clinical thermometer having a connecting mechanism for attaching and detaching a temperature measuring probe to and from a thermometer body.

2. Description of the Prior Art

An electronic clinical thermometer of this type, which is used when measuring body temperature, employs a plug socket-type connector for connecting a temperature measuring probe to the main body of the thermometer.

A problem encountered in the conventional electronic clinical thermometer having the plug socket-type connector is that the connector surface sustains wear whenever the temperature probe and thermometer body are attached and detached. Furthermore, since the connecting portion of the connector is mainly an oxide, a high contact resistance is encountered at the time of connection so that a temperature display obtained from the main body of the thermometer becomes an erroneous display without reproducibility. In addition, in order to prevent erroneous connection of the plug socket, insertion into the socket is performed only at a fixed position, thus making it very troublesome to connect the connector.

For example, in the operation for connecting the plug socket-type connector, lead wires are soldered to a variety of terminals. To accomplish this, a multi-core cord is connected to a very small connector terminal. As a consequence, the soldering operation is a difficult one and the connecting method can cause failures such as shorts and wire breakage.

SUMMARY OF THE INVENTION

An object of the invention is to solve the foregoing problems encountered in the prior art.

Another object of the invention is to provide a detachable-probe type electronic clinical thermometer in which an increase in contact resistance is minimized and connectors can be connected in a simple manner.

Still another object of the invention is to provide a detachable-probe type electronic clinical thermometer in which a temperature measuring probe and the thermometer main body are electrically connected by reducing the size of connectors.

Still another object of the invention is to provide a detachable-probe type electronic clinical thermometer in which, when a temperature measuring probe and the main body of the thermometer are connected by respective connectors, spring bodies provided for respective electrical contacts of one connector on the side of the thermometer body readily urge the respective electrical contacts of the other connector on the side of the temperature measuring probe in such a manner that these contacts, which are furnished in the two connectors so as to correspond to each other, will be electrically connected to each other.

A further object of the invention is to provide a detachable-probe type electronic clinical thermometer in which the contact resistance between connectors at the time of connection is reduced by employing a clip-type connector as the connector for the body of the thermometer.

Yet another object of the invention is to provide a detachable-probe type electronic clinical thermometer in which a connector on the measuring probe side and a connector on the thermometer body side have cross sectional shapes intersecting the directions in which the two connectors are fitted together that are either projections or recesses, so that when the two connectors are fitted together, the respective mating portions fit together in such a manner that central positions of the respective connectors in the mounting direction coincide.

Yet another object of the invention is to provide a detachable-probe type electronic clinical thermometer in which, when a clip-type connector of the thermometer body is clamped on the connector of a temperature measuring probe, central positions in the fitting direction are readily aligned while correcting the clamping position of the probe connector and clip-type connector, this being accomplished by adopting the shape of an isosceles trapezoid for the shapes of the cross sections of the respective connectors which intersect the mounting direction.

Yet another object of the invention is to provide a detachable-probe type electronic clinical thermometer in which clamping engagement at the time of connection is strengthened by respective clamping engaging portions of a connector on a temperature measuring probe and a connector of the thermometer main body, whereby the two connectors will not readily become detached from each other.

Still another object of the invention is to provide a detachable-probe type electronic clinical thermometer in which, by providing the temperature measuring probe connector with a clamped portion having a projection which extends in a direction intersecting the direction in which the two connectors are fitted together, clamping engagement between the two connectors in the fitting direction is strengthened.

A further object of the invention is to provide a detachable-probe type electronic clinical thermometer in which, by adopting torsion coil springs as the electrical contacts of the connector of the thermometer body, the contacts of the thermometer body connector can be electrically connected to the corresponding contacts of the probe connector while excellent, stable contact is maintained at all times.

A further object of the invention is to provide a detachable-probe type electronic clinical thermometer in which, by adopting extended portions of one ends of torsion coil springs as the electrical contacts of the connector of the thermometer body, the arrangement of the contacts can be freely designed.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the accompanying drawings.

Figure 1:
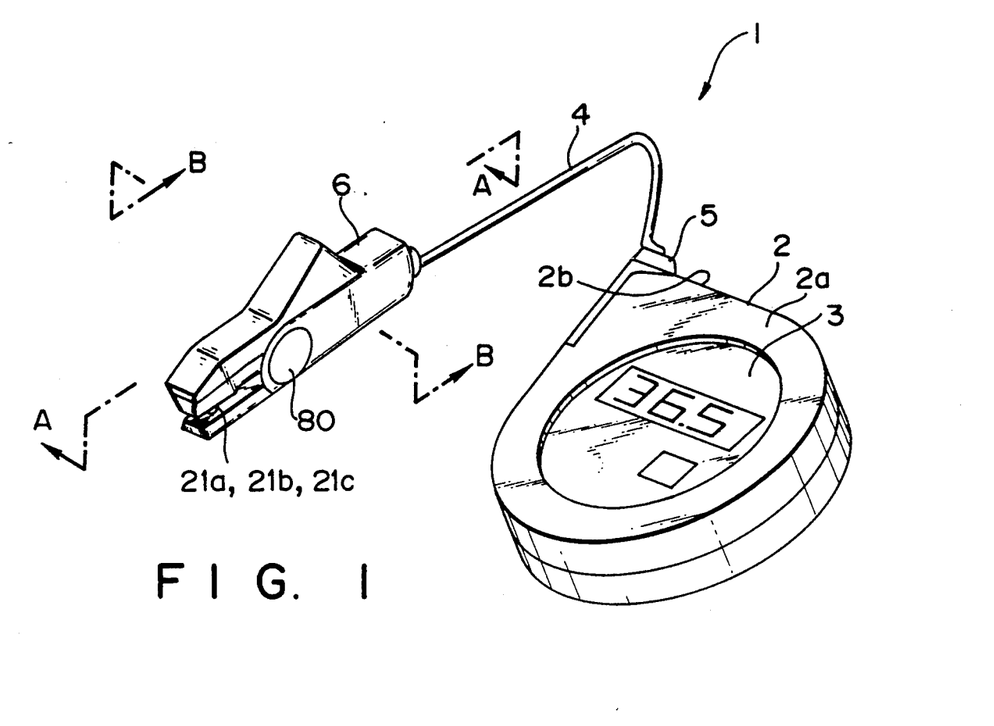
FIG. 1 is an external perspective view illustrating an embodiment of a detachable probe-type electronic clinical thermometer according to the present invention.

FIG. 1 is an external perspective view illustrating the arrangement of a detachable probe-type electronic clinical thermometer according to an embodiment of the present invention. In FIG. 1, numeral 1 denotes the detachable probe-type electronic clinical thermometer of the embodiment. Numeral 2 denotes a square main body housing a CPU (a central processing unit, not shown) in which body temperature data are entered from a temperature measuring probe, described below, for computing the value of body temperature based on these data. The main body 2, which is is molded into a columnar form the corners of which are smoothly rounded, has an upper surface 2a provided with a display section 3 for displaying a value of body temperature by means of a liquid crystal cell. Mounted in the interior of the main body 2 is a cord 4 of a prescribed length capable of being freely wound up or pulled out. Provided on a side face 2b of the main body 2 is an extraction opening 5 through which the cord 4 passes when being wound up and pulled out. The main body has a connector 6, which is for connecting the main body 2 to a temperature measuring probe 40, described below. The connector 6 is attached to the distal end of the cord 4. The connector 6 has a clip-type hinge lever mechanism in the form of a clothspin.

The internal arrangement of the connector 6 shown in FIG. 1 will now be described.

Figure 2:
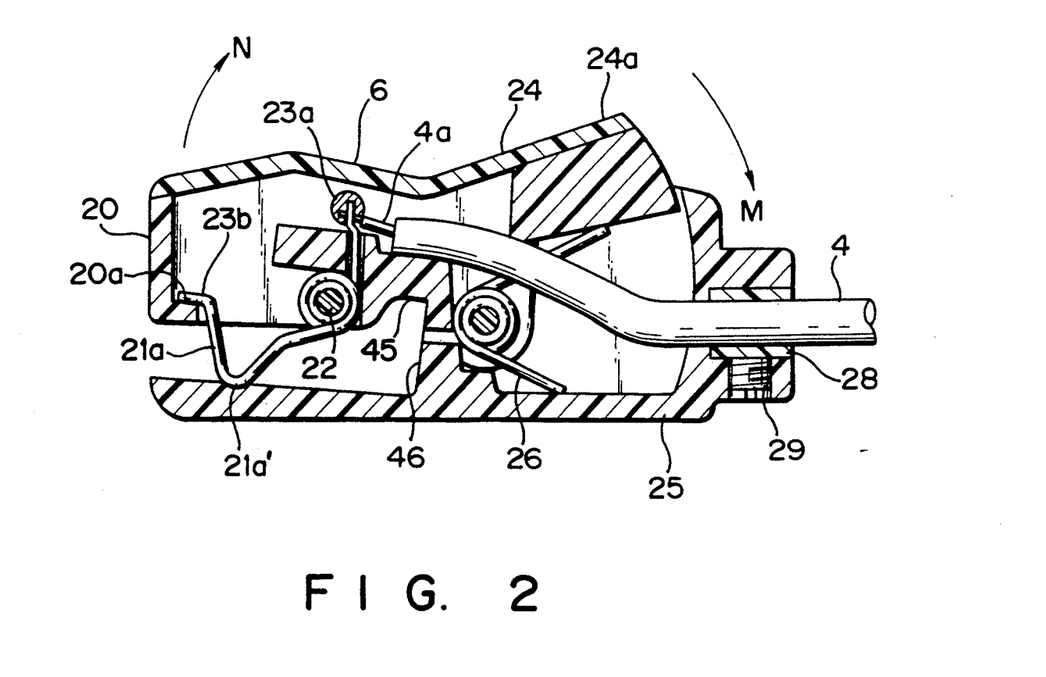
FIG. 2 is a sectional view taken along line A—A of FIG. 1.
Figure 3:
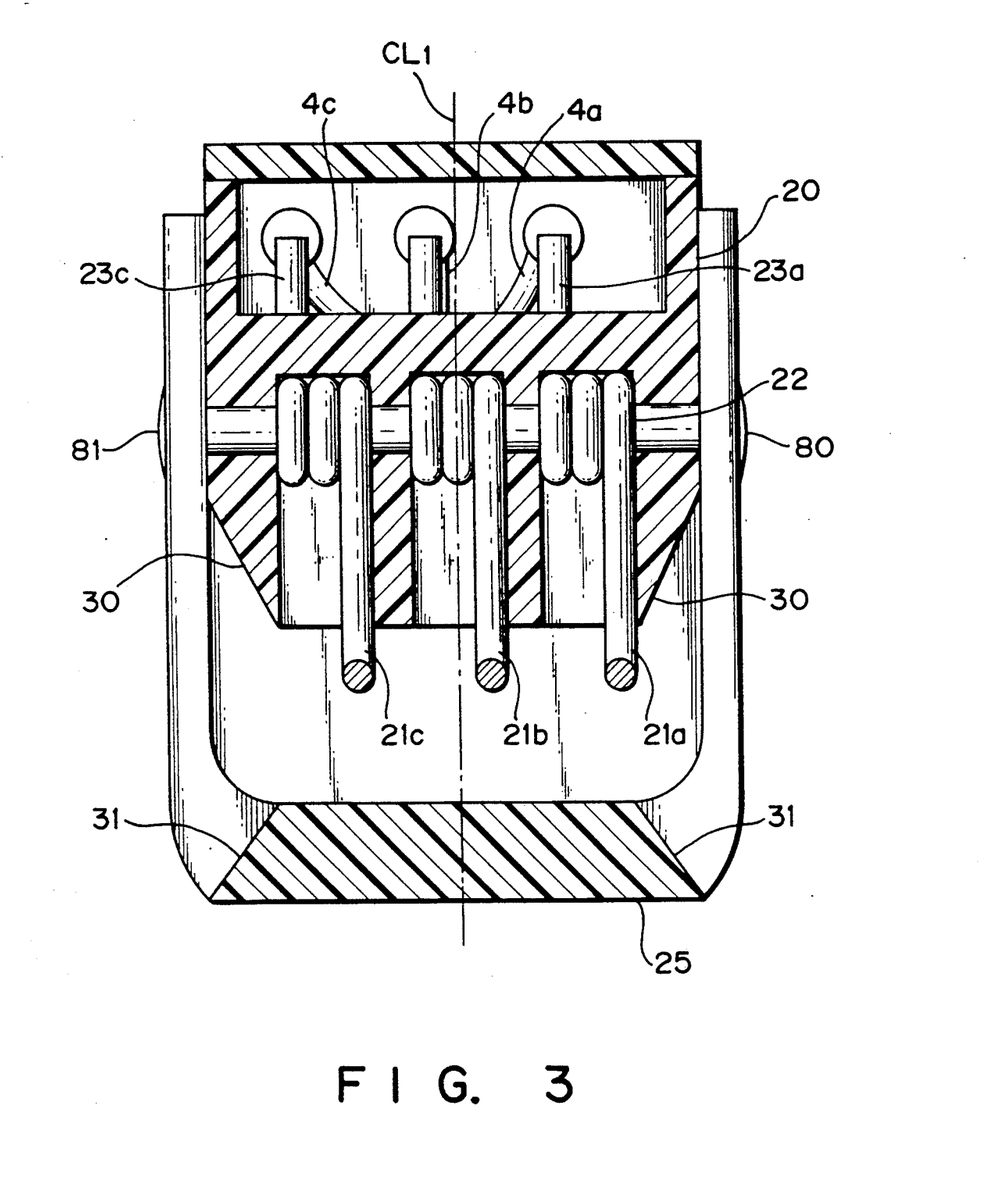
FIG. 3 is a sectional view taken along line B—B of FIG. 1.

FIG. 2 is a sectional view taken along line A—A of FIG. 1, and FIG. 3 is a sectional view taken along line B—B of FIG. 1.

As shown in FIGS. 2 and 3, the connector 6 generally comprises two units. One unit is a connector body 25 constituting the main body of the connector 6, and the other unit is a connector arm 20 pivotally supported on the connector body 25 and acted upon by the force of a spring to clamp a connector 41 on the side of a temperature measuring probe 40, described below. Torsion coil spring-shaped contacts 21a–21c are independently wound on the outer peripheral surface of a resin pin 22 at the distal end of the connector arm 20. These contacts will now be described, taking the contact 21a as an example.

A core wire 4a of the cord 4 is soldered to an upwardly extending distal end portion 23a of the contact 21a. The other end portion of the contact 21a is bent into a V-shaped configuration, as shown in FIG. 2, the apex of which forms a contact portion 21a' functioning as a contact for electrical connection with the temperature measuring probe 40. The contact 21a has a tip 23b bent into an L-shaped configuration. The tip 23b is pressured by the spring force of the contact 21a so as to engage a backwardly bent portion 20a of the connector arm 20. Of course, the contacts 21b, 21c also have one ends 23b, 23c soldered to core wires 4b, 4c of the cord 4, just as in the case of the connector 21a; and the other end portions are provided with respective V-shaped contact portions 21b', 21'c (not shown).

The upper portion of the connector arm 20 is sealed by a connector cap 24 formed so as to have a rising back end. This rising back end of the connector cap 24 forms a finger grip 24a depressed by a finger, as will be described below. The side faces of the connector arm 20 are covered by the side faces of the connector body 25. A wave pin 27 passes through these overlapping side faces, and the arrangement is such that the mouth of the connector 6 will open about the wave pins 27. A torsion coil sping 26 is wound about the outer peripheral surface of the wave pin 27 in order to obtain the clamping force of the mouth of connector 6 by biasing the respective rear end portions of the connector arm 20 and connector body 25 so that they will be urged apart about the wave pin 27. Thus, the arrangement is such that the connector arm 20 is anchored in the connector body 25 in the manner described above. The wave pin 27 is axially supported on the side faces of the connector body 25 from the outer side by respective caps 80, 81. By virtue of this arrangement, the clip-type connector 6 is provided with a hinge lever mechanism. A mechanism for preventing the cord 4 from falling out is constructed at the rear end of the connector 6 by a bush 28 and a screw 29 securing the bush 28.

FIG. 3 illustrates the connection to the temperature measuring probe, namely a projecting mating portion 30 having the shape of an isosceles trapezoid which widens upwardly toward the top of the connector arm 20, and a projecting mating portion 31 provided at the distal end of the connector body 25 and having the shape of a downwardly widening isosceles trapezoid.

The temperature measuring probe of the present embodiment will now be described with reference to FIGS. 4 through 6.

Figure 4:
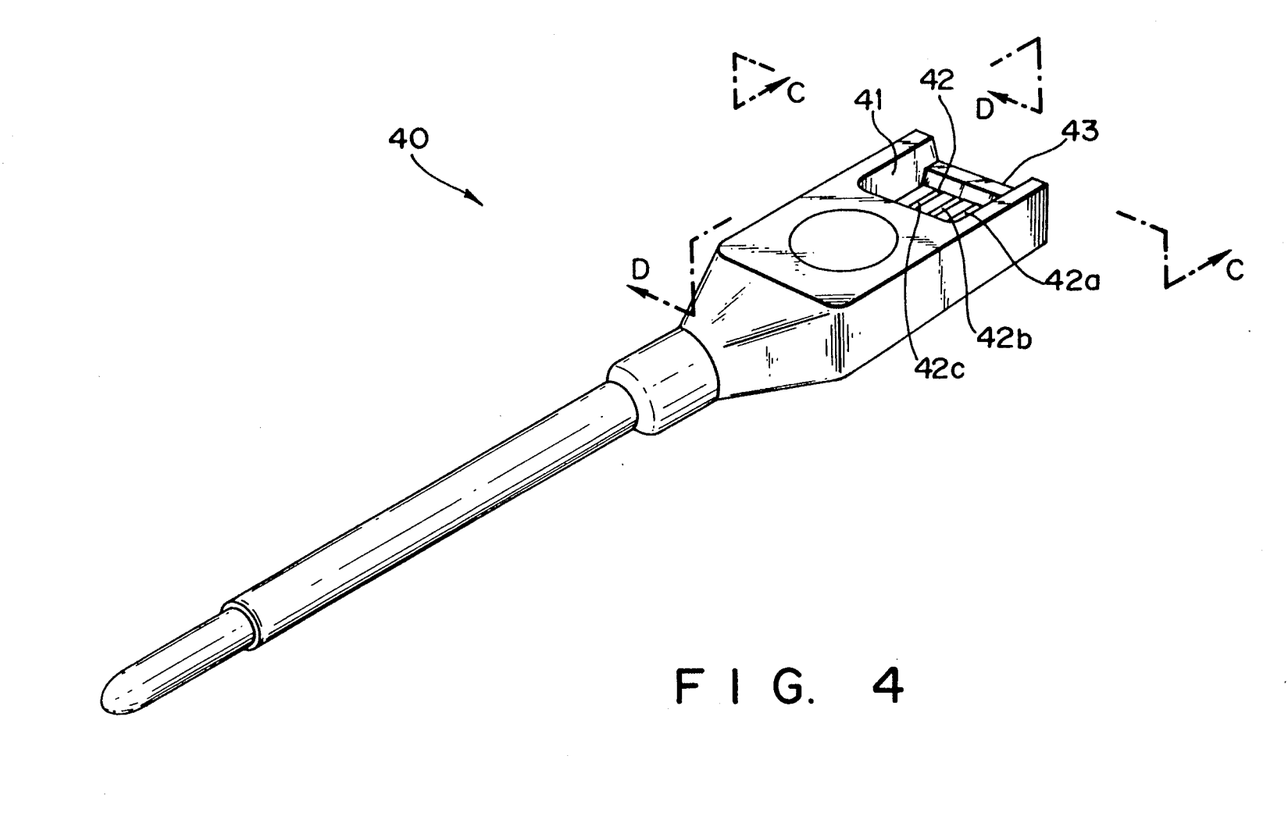
FIG. 4 is an external perspective view illustrating the construction of a temperature measuring probe connected to the detachable probe-type electronic clinical thermometer shown in FIG. 1.
Figure 5:
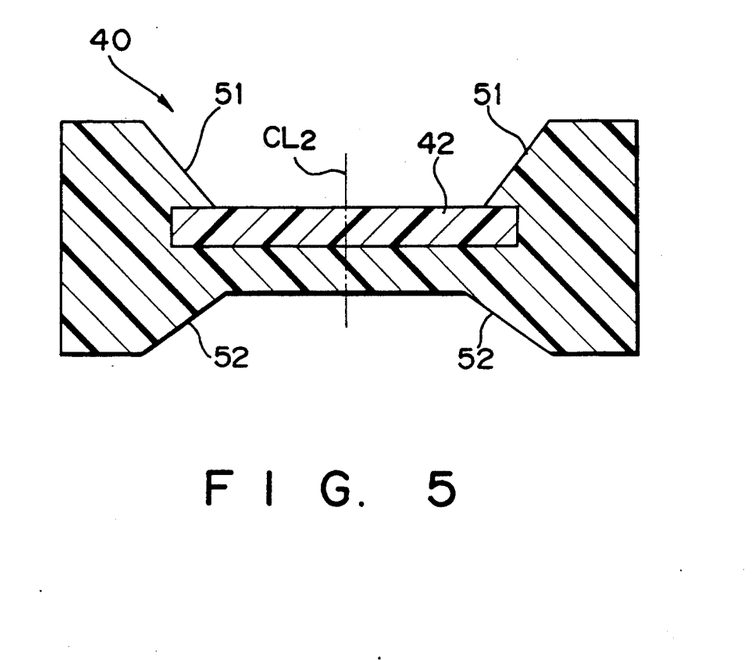
FIG. 5 is a sectional view taken along line C—C of FIG. 4.
Figure 6:
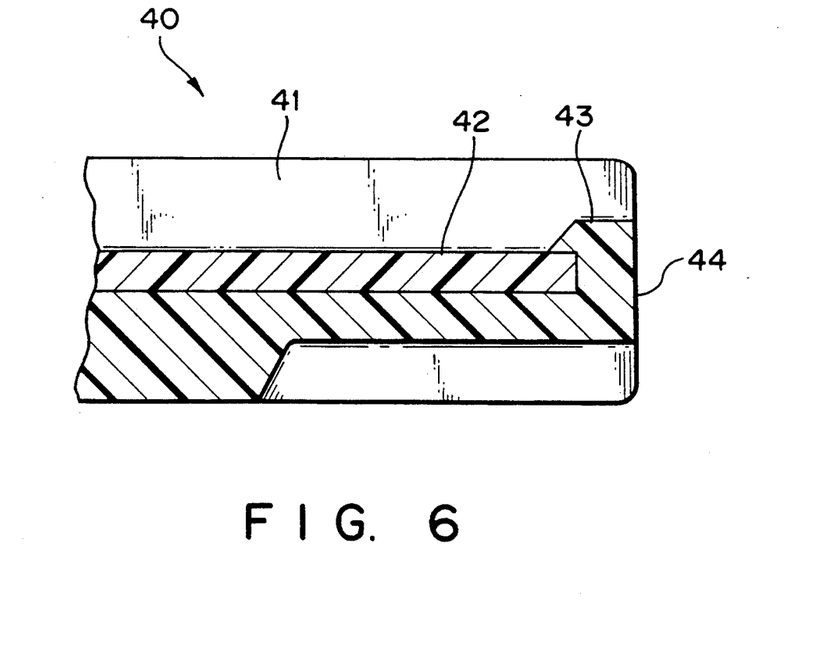
FIG. 6 is a sectional view taken along line D—D of FIG. 4.

FIG. 4 is an external perspective view illustrating the construction of the temperature measuring probe 40 connected to the detachable probe-type electronic clinical thermometer shown in FIG. 1, FIG. 5 is a sectional view taken along line C—C of FIG. 4, and FIG. 6 is a sectional view taken along line D—D of FIG. 4. As shown in FIG. 4, the rear end face of the probe 40 is provided with a tongue-shaped connector portion 41 having a circuit board 42 a portion of which is exposed. The exposed portion of the board 42 is formed to have pattern surfaces 42a–42c for achieving electrical contact with the contact portions 21a'–21c' of the independently operating contacts 21a–21c. As shown in FIG. 5, the temperature measuring probe 40 is provided with a recessed mating portion 51 having the shape of an isosceles trapezoid which widens upwardly toward the top of the connector 41, and a recessed mating portion 52 having the shape of a downwardly widening isosceles trapezoid. These recessed mating portions 51, 52 are shaped substantially symmetrically so as to mate with the trapezoidal projecting mating portions 30, 31, respectively.

The rear end face of the connector 41 of probe 40 is provided with a projection 43 extended upwardly in a direction intersecting the direction in which the connectors are fitted together. The projecting portion 43, which serves as a clamped portion, is so provided as to mate with a recess 45 formed on the inner surface of the connector arm 20 (FIG. 2) when the connector 6 is clamped on the connector 41. Thus, the projection 43 functions as a locking mechanism to assure that the probe 40 will not readily be pulled off the connector 6.

Described next will be the method of connecting the connector 6 on the side of the main body 2 and the connector 41 on the side of the temperature measuring probe 40.

Figure 7:
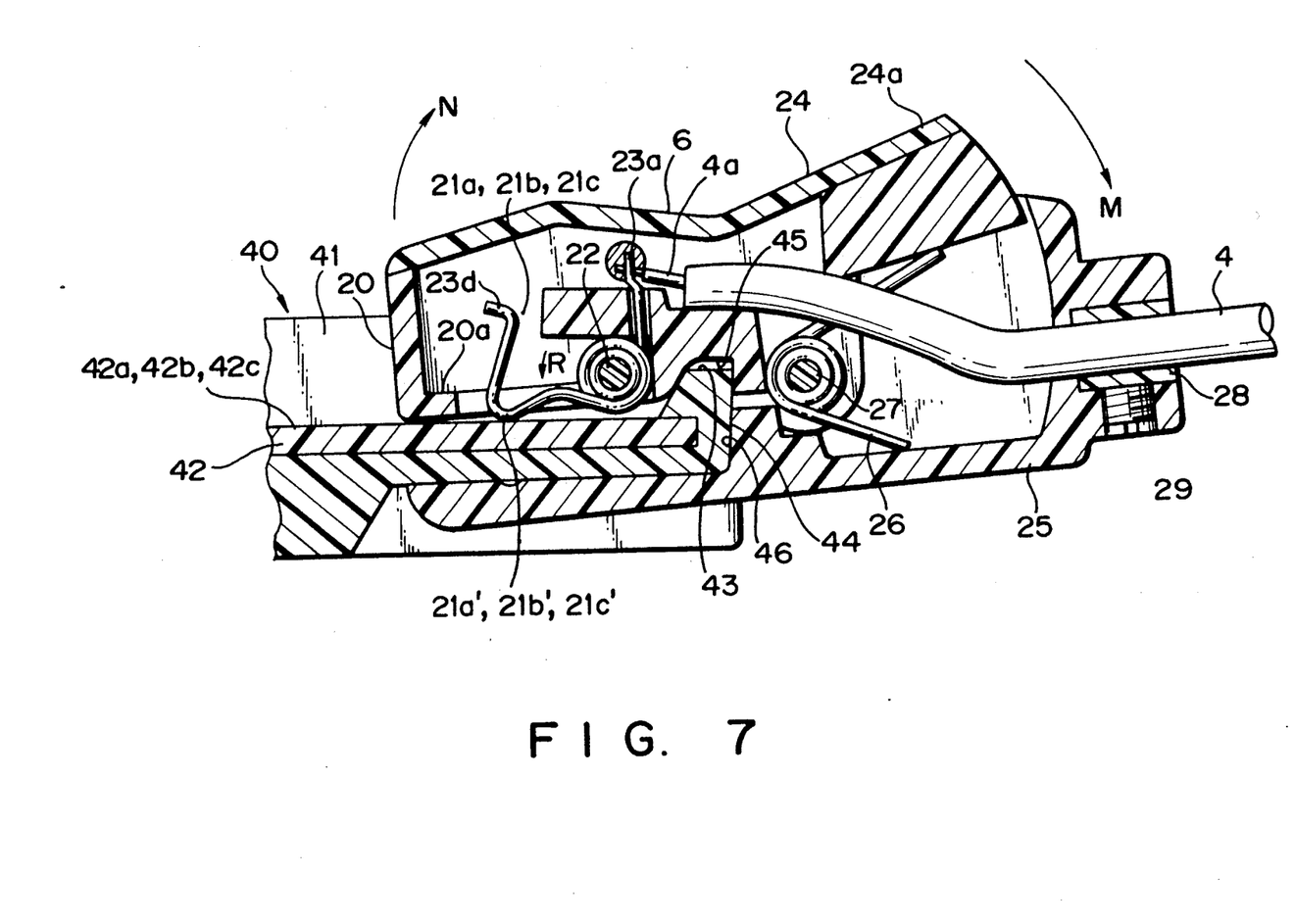
FIG. 7 is a sectional view illustrating the state of connection between a connector of the thermometer body and a connector of the temperature measuring probe.

FIG. 7 is a sectional view illustrating the state of connection between the connector 6 of the thermometer body 2 and a connector 41 of the temperature measuring probe 40.

First, the board 42 of the connector 41 and the contacts 21a–21c of the connector 6, as well as the projection 43 and the recess 45, are simultaneously engaged. At this time the user presses the finger grip 24a, which is provided on the connector cap 24, from above in the direction of arrow M, as shown in FIG. 2. This causes the connector arm 20 to open in the direction indicated by arrow N. Next, the operator inserts the connector 41 of the temperature measuring probe 40 shown in FIG. 6 until the rear end face 44 of the connector 41 abuts against a receiving portion 46 of the connector 6 shown in FIG. 2. When the finger of the user is withdrawn to remove the force pressing down on the finger grip portion 24a of the connector cap 24, the trapezoidal projecting mating portions 30, 31 of the connector 6 mate with the recessed trapezoidal mating portions 51, 52 of the connector 41. At this time the clamping positions between the recessed mating portions 51, 52 provided on the upper and lower portions of the connector 41 on both side surfaces thereof are connected in such a manner that a central axis CL1 of connector 6 shown in FIG. 3 and a central axis CL2 of connector 41 shown in FIG. 5 coincide. Thus, the biasing force of the torsion coil spring 26 is utilized in mating the projecting mating portions 30, 31 with the recessed mating portions 51, 52 and the projection 43 with the recess 45.

By utilizing the characterizing feature wherein the contacts 21a–21c, which are made of phosphor bronze wire and provided in the connector 6, are each formed into a torsion coil-like configuration, the contact portions 21a′–21c′ thereof are brought independently into electrical contact with the pattern surfaces 42a–24c of the board 42 while being urged against these surfaces substantially vertically from above by an urging force (which acts in the direction R) ascribable to spring restoration, as shown in FIG. 7. Thus, the independent urging forces of the contacts 21a–21c are utilized so that the contacts can resiliently accommodate themselves to the surface condition, such as any unevenness, of the pattern surfaces 42a–42c on board 42.

In the present embodiment, the connector 6 employs a three-pole multiple pole connector. Accordingly, even if the respective connector contact surfaces, namely the board 42, are not formed to be flat, the fact that the contacts 21a–21c possess independent torsion coil springs assures that the respective springs will maintain stable contact at all times. Effectiveness is also assured with regard to bending fatigue. In the present embodiment, the contacts 21 are nickel plated and then plated with 0.3 μ of gold for the purpose of increasing the conductivity and preventing the surface oxidation of the surfaces of the phosphor bronze wires, which exhibit the spring property and electrical conductivity as well. Similarly, in the temperature measuring probe 40, the pattern surfaces of the board 42 in the connector 41 are plated with 0.3 μ of gold. Thus, poor contact caused by an increase in contact resistance is minimized so that connector life can be prolonged.

Thus, in accordance with the present invention as described above, there can be provided a detachable probe-type electronic clinical thermometer in which there is minimal contact resistance when the probe and thermometer body are connected by their connectors, and in which the connectors can be joined with ease. In addition, owing to a stable retaining force which prevails when the connectors are connected together, it is possible to prevent an interruption in temperature measurement owing to unwanted detachment of the temperature measuring probe. Furthermore, since the connector of the temperature measuring probe and the connector of the thermometer body are not of the insertion type, it is unnecessary for one connector to be made much larger than the other. This makes it possible to reduce the size of the connectors.

As many apparently widely different embodiments of the present invention can be made without departing from the spirit and scope thereof, it is to be understood that the invention is not limited to the specific embodiments thereof except as defined in the appended claims.

What is claimed is:

1. A detachable probe-type electronic clinical thermometer comprising:
   a temperature measuring probe equipped with at least a first connector; and
   a clinical thermometer main body equipped with a cord to a distal end of which is attached a second, clip-type connector adapted for being connected with said first connector;
   said first and second connectors each having a plurality of corresponding electrical contacts;
   said plurality of electrical contacts of said second connector each comprising a spring body through which passes an electrical signal from said probe;
   each of said plurality of spring bodies independently and directly engaging, due to a spring urging force thereof, the corresponding electrical contact of said first connector when the plurality of contacts of said first and second connectors are electrically connected to each other.

2. The thermometer according to claim 1, wherein said first connector has a mating portion whose cross-sectional shape transverse to a fitting direction in which said first and second connectors are fitted together includes a recess; and
   said second connector has a mating portion whose cross-sectional shape transverse to said fitting direction in which said first and second connectors are fitted together includes a projection, said projection being adapted to mate with walls defining said recess;
   said respective mating portions of the first and second connectors mating in such a manner that the transverse centers of said first and second connectors coincide when said first and second connectors are fitted together.

3. The thermometer according to claim 2, wherein the transverse cross-sectional shapes of said recessed mating portion and said projecting mating portion have substantially symmetrical, substantially isosceles trapezoidal configurations, respectively.

4. The thermometer according to claim 2, wherein a cross sectional shape of the first connector extending in said fitting direction in which said first and second connectors are fitted together has a locking projecting portion, and the cross sectional shape of the second connector extending in said fitting direction has a locking recessed portion, and said projecting and recessed portions being fitted together to prevent disengagement of the first and second connectors from each other in the fitting direction.

5. The thermometer according to claim 1, wherein said springs are torsion coil springs.

6. The thermometer according to claim 5, wherein the contacts of said thermometer body are formed by extending end portions of said torsion coil springs.

* * * * *

UNITED STATES PATENT AND TRADEMARK OFFICE
CERTIFICATE OF CORRECTION

PATENT NO. : 5,024,622

DATED : June 18, 1991

INVENTOR(S) : T. IDE

It is certified that error appears in the above-identified patent and that said Letters Patent is hereby corrected as shown below:

Column 5, line 48, "42a-24c" should read --42a-42c--.

Signed and Sealed this

Thirtieth Day of March, 1993

Attest:

STEPHEN G. KUNIN

Attesting Officer

Acting Commissioner of Patents and Trademarks